(12) United States Patent  
Ramin et al.

(10) Patent No.: US 8,033,593 B2
(45) Date of Patent: Oct. 11, 2011

(54) VEHICLE BODY FOR A MOTOR VEHICLE

(75) Inventors: Wolfgang Ramin, Vaihingen (DE); Joachim Paul, Stuttgart (DE); Tobias Posch, Pforzheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 239 days.

(21) Appl. No.: 12/471,816

(22) Filed: May 26, 2009

(65) Prior Publication Data

US 2010/0026044 A1 Feb. 4, 2010

(30) Foreign Application Priority Data

Aug. 2, 2008 (DE) .......................... 10 2008 036 188

(51) Int. Cl.
*B62D 35/00* (2006.01)
(52) U.S. Cl. ................ 296/180.2; 296/180.1; 296/180.3
(58) Field of Classification Search ............... 296/180.1, 296/180.2, 180.3, 180.4, 180.5
See application file for complete search history.

(56) References Cited

U.S. PATENT DOCUMENTS

| 4,688,840 | A | * | 8/1987 | Kretschmer | 296/180.1 |
| 4,810,022 | A | * | 3/1989 | Takagi et al. | 296/180.5 |
| 4,854,635 | A | * | 8/1989 | Durm et al. | 296/180.5 |
| 4,886,312 | A | * | 12/1989 | Asoh | 296/76 |
| 4,887,681 | A | * | 12/1989 | Durm et al. | 180/68.1 |
| 5,141,281 | A | * | 8/1992 | Eger et al. | 296/180.5 |
| 5,346,274 | A | * | 9/1994 | Syamal et al. | 296/180.1 |
| 5,923,245 | A | * | 7/1999 | Klatt et al. | 340/479 |
| 5,934,740 | A | * | 8/1999 | Moebius et al. | 296/180.1 |
| 7,111,898 | B2 | * | 9/2006 | Rinklin | 296/180.1 |
| 7,481,482 | B2 | | 1/2009 | Grave et al. | |

FOREIGN PATENT DOCUMENTS

DE 103 09 369 A1 9/2004
DE 10 2006 009 048 A1 9/2007

* cited by examiner

*Primary Examiner* — Lori Lyjak

(57) ABSTRACT

In a rear end of the vehicle body, an assembly carrier which is arranged in the vehicle transverse direction is inserted between inner body-side side parts of the vehicle rear end. The assembly carrier holds pre-assemblable components and to which assembly carrier is fastened a rear-end trim panel and which assembly carrier is fixedly connected to the two inner side parts by screw devices and forms a stiffening body cross member.

11 Claims, 6 Drawing Sheets

VEHICLE BODY FOR A MOTOR VEHICLE

CROSS-REFERENCE TO RELATED APPLICATION

This application claims the priority, under 35 U.S.C. §119, of German application DE 10 2008 036 188.7, filed Aug. 2, 2008; the prior application is herewith incorporated by reference in its entirety.

BACKGROUND OF THE INVENTION

Field of the Invention

The invention relates to a vehicle body for a motor vehicle having a vehicle rear end which contains body-side inner side parts, which are arranged so as to be spaced apart from one another, and an outer rear-end trim panel which, with the inner side parts, surrounds a holding space for a rear-mounted engine. The holding space is closed off by a pivotable rear lid which is adjoined by a spoiler which can be retracted and deployed by a setting-out mechanism.

Published, non-prosecuted German patent application DE 10 2006 009 048 A1 discloses an air-guiding device for a vehicle, in which a drive motor for actuating elements of the air-guiding device is arranged on a carrier plate. The carrier plate is formed as a punched metal sheet and is fixed to a luggage compartment cover by screw connections. Furthermore, published, non-prosecuted German patent application DE 103 09 369 A1, corresponding to U.S. Pat. No. 7,481,482, discloses an air-guiding device which is embodied as a module and contains a carrier plate which can be inserted in a cutout of the bodyshell and on which all the movable parts of the air-guiding device, such as for example a hydraulic and electric drive, are supported.

SUMMARY OF THE INVENTION

It is accordingly an object of the invention to provide a vehicle body for a motor vehicle that overcomes the above-mentioned disadvantages of the prior art devices of this general type, in which, with structurally simple measures, the vehicle rear end can be reinforced and, at the same time, a pre-assemblable unit for a retractable and deployable spoiler and of further components is obtained.

With the foregoing and other objects in view there is provided, in accordance with the invention, a vehicle body for a motor vehicle. The vehicle body contains a setting out mechanism, a spoiler being retracted and deployed by the setting-out mechanism, a pivotable rear lid, fastening devices, and a vehicle rear end having body-side inner side parts disposed so as to be spaced apart from one another, and an outer rear-end trim panel which, with the body-side inner side parts, surrounds a holding space for a rear-mounted engine. The holding space is closed off by the pivotable rear lid which is adjoined by the spoiler. An assembly carrier is disposed in a vehicle transverse direction and inserted between the two inner body-side side parts of the vehicle rear end. The assembly carrier holding pre-assemblable components and can be connected to the outer rear-end trim panel. The assembly carrier is fixedly connected to the two inner side parts by the fastening devices, and the assembly carrier forms a stiffening body cross member.

The main advantages obtained by the invention are that, first, a stiff rear-end body structure and, second, a holding module for pre-assemblable components can be created by an assembly carrier fastened between inner side parts of the vehicle body. This is achieved according to the invention in that an assembly carrier which is arranged in the vehicle transverse direction is inserted between the two inner body-side side parts of the vehicle rear end, which assembly carrier holds pre-assemblable components and can be connected to the rear-end trim panel and which assembly carrier is fixedly connected to the two inner side parts by screw devices and therefore forms a stiffening body cross member.

The assembly carrier has, on its upper and lower sides and on its end sides, contact surfaces for the pre-assemblable components. The assembly carrier is provided, in each case at its free ends, with bores, which are arranged spaced apart from one another, for fastening devices to the inner side parts of the vehicle body, with in each case one centering or locating pin for positional fixing on the inner side parts being provided between the bores. By this configuration of the assembly carrier and the fixing thereof to the inner body-side side parts of the vehicle body, a pre-assemblable unit is created which simultaneously reinforces the bodyshell at the rear end, since the assembly carrier acts as a strength-increasing body cross member in the strength bond of the bodyshell.

The assembly carrier has a horizontally aligned end-side contact surface which is directed toward the rear-end trim panel and to which a corresponding edge of the rear-end trim panel can be connected by fastening devices. Furthermore, the rear-end trim panel is connected to the assembly carrier over one longitudinal region and is connected, over an adjoining further longitudinal region, to a retaining strip which is arranged on a lamp body for a rear-end lamp, which lamp body is held on the inner side wall parts to which the assembly carrier can also be fastened. By this configuration, the rear-end trim panel can be fixed to the vehicle body in a positionally accurate fashion continuing from the assembly carrier.

The assembly carrier has, on an underside contact surface and in a vehicle longitudinal central plane, a pre-assemblable drive motor with drive shafts, which extend to both sides, for a setting-out mechanism of the spoiler. Furthermore, a pre-assemblable lock for the pivotable rear lid is arranged on the rear side of the assembly carrier on a further contact surface—as viewed in relation to the direction of travel. Furthermore, an actuating element with a Bowden cable for the lock of the rear lid is arranged on an upper-side contact surface of the assembly carrier, close to the free end of the assembly carrier. Furthermore, the pre-assemblable setting-out mechanism for the spoiler is arranged on the assembly carrier at both sides of the vehicle longitudinal central plane, and an activation module for a front closing part—as viewed in relation to the direction of travel F—is additionally provided on one side of the assembly carrier. By this attachment of the individual components to the assembly carrier before installation into the vehicle, the assembly of the components and of the spoiler is simplified. For this purpose, the setting-out mechanism of the spoiler projects partially through openings in the assembly carrier, which setting-out mechanisms are connected to a lower part of the spoiler.

The assembly carrier is preferably composed of a cast aluminum part and is formed, in cross section, with a plurality of steps, and in the central region, the assembly carrier has a plurality of transversely running hollow ribs which are arranged on the upper step or so as to delimit the steps at the edge side. By this configuration, optimum stiffness of the assembly carrier is obtained overall such that, with the inner side parts of the vehicle body, a rigid strength bond is obtained in the rear-end region of the bodyshell. Alternatively, the assembly carrier may also be composed of sheet metal or fiber-reinforced plastic.

Other features which are considered as characteristic for the invention are set forth in the appended claims.

Although the invention is illustrated and described herein as embodied in a vehicle body for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
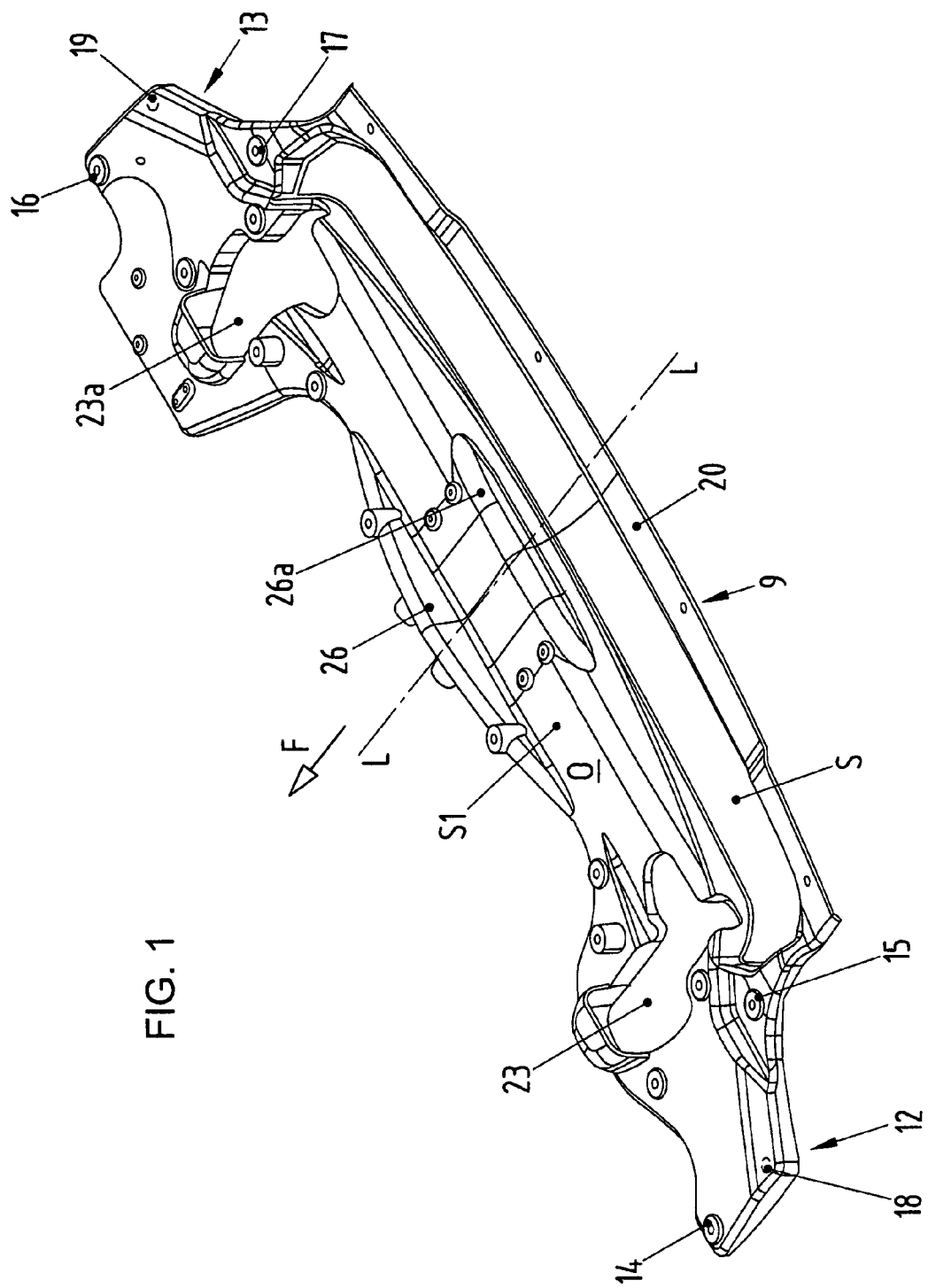
FIG. 1 is a diagrammatic, top perspective view of an assembly carrier according to the invention.
Figure 2:
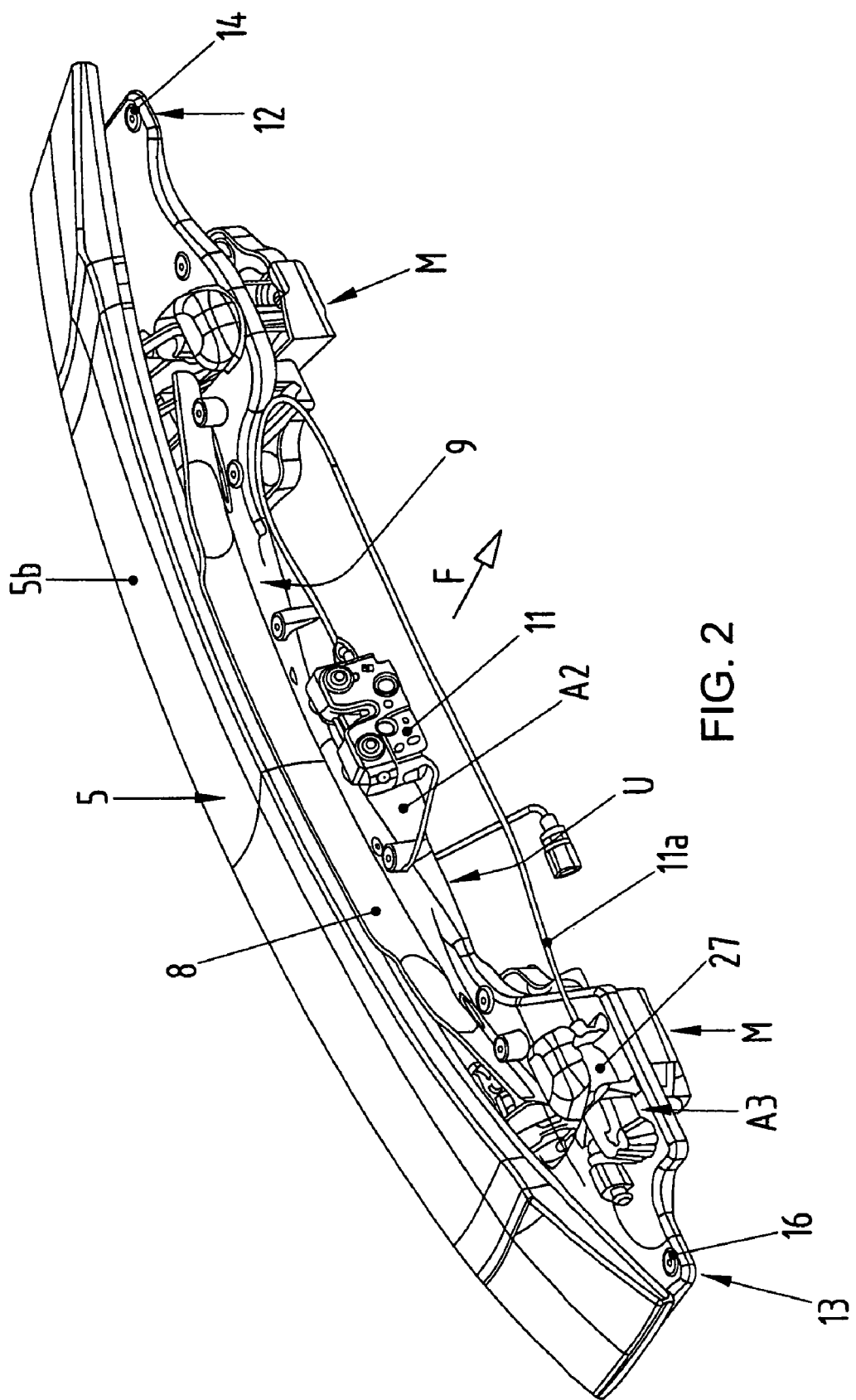
FIG. 2 is a diagrammatic, perspective view of the assembly carrier with assembled components as viewed counter to a direction of travel.
Figure 3:
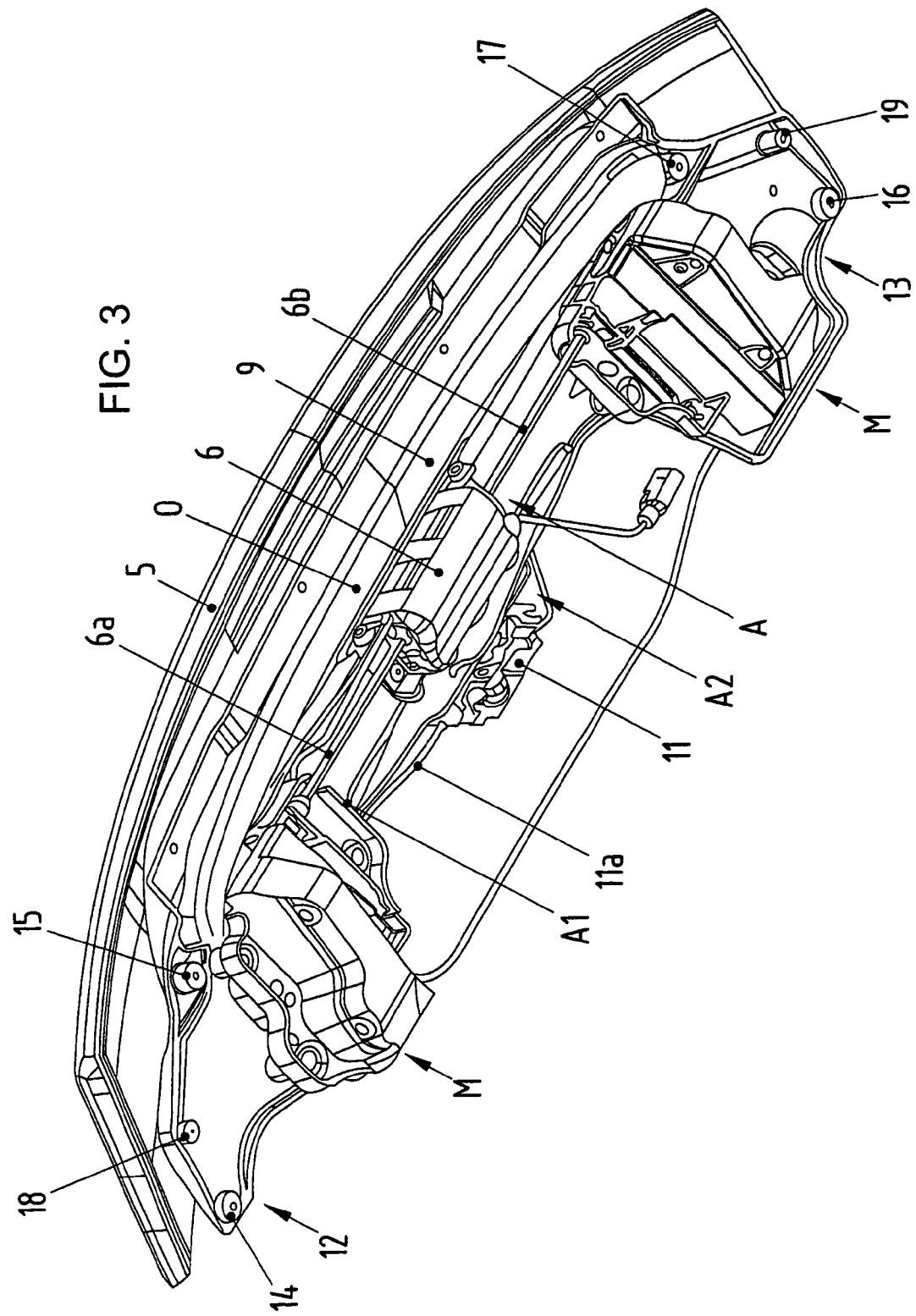
FIG. 3 is a diagrammatic, bottom perspective view of the assembly carrier with assembled components.
Figure 4:
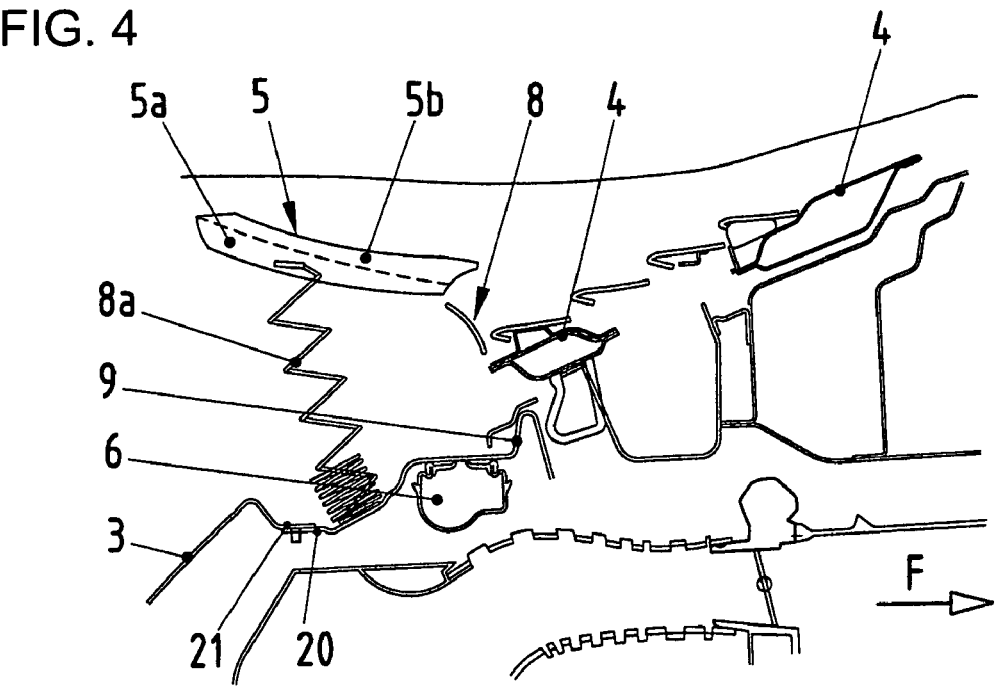
FIG. 4 is a diagrammatic, sectional view through the assembly carrier installed in the vehicle and taken along the line IV-IV shown in FIG. 6.
Figure 5:
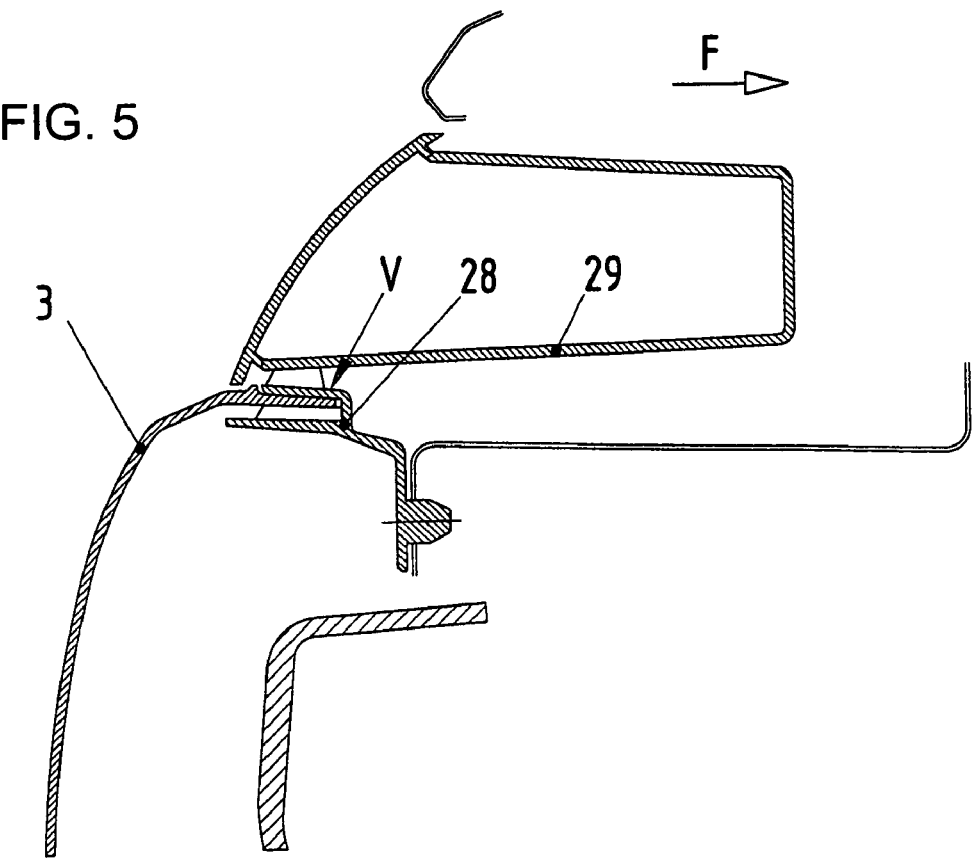
FIG. 5 is a diagrammatic, sectional view through a rear-end trim panel in a region of a rear-end lamp taken along the line V-V shown in FIG. 7.
Figure 6:
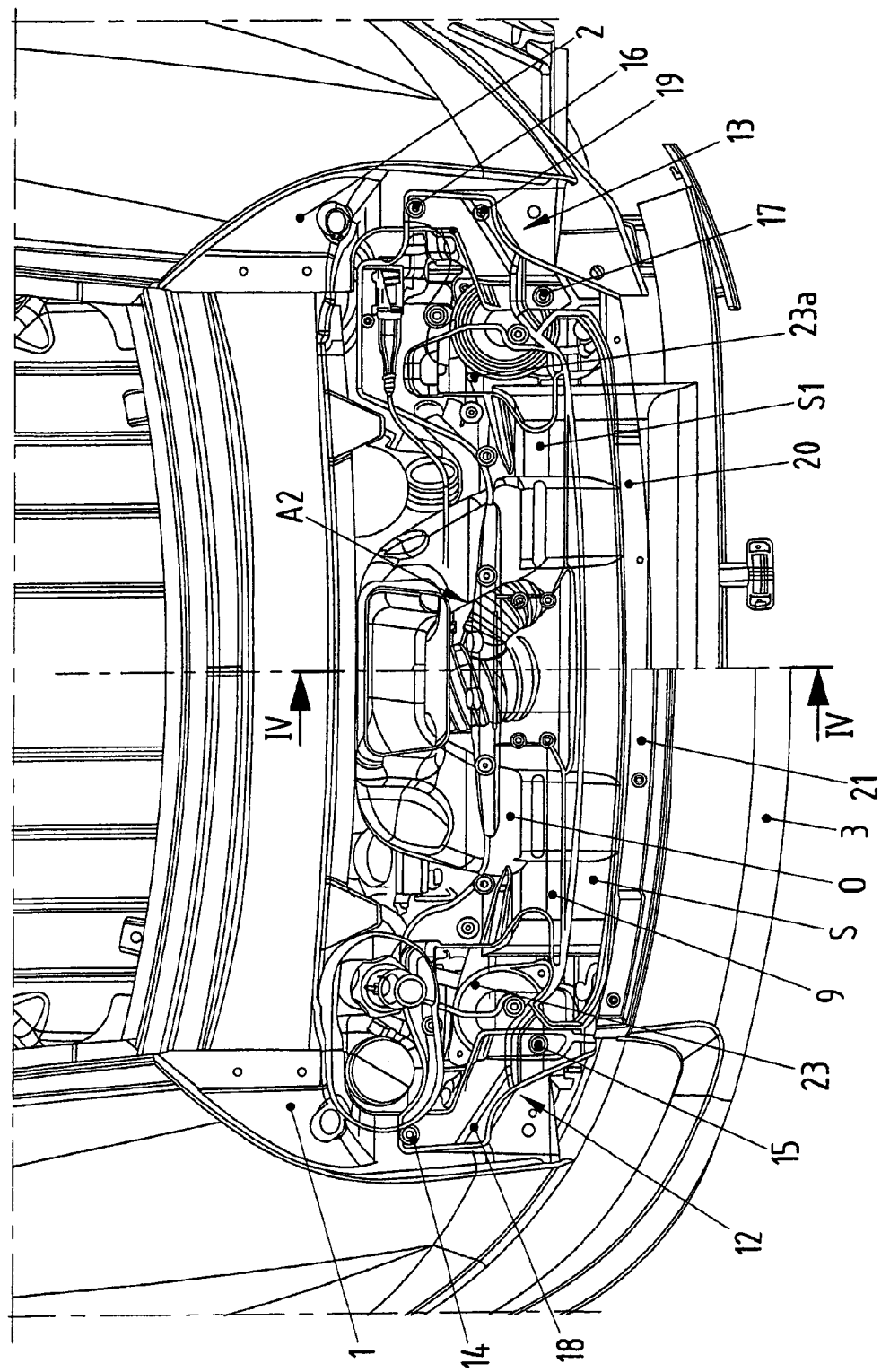
FIG. 6 is a diagrammatic, plan view of the assembly carrier installed in a vehicle.
Figure 7:
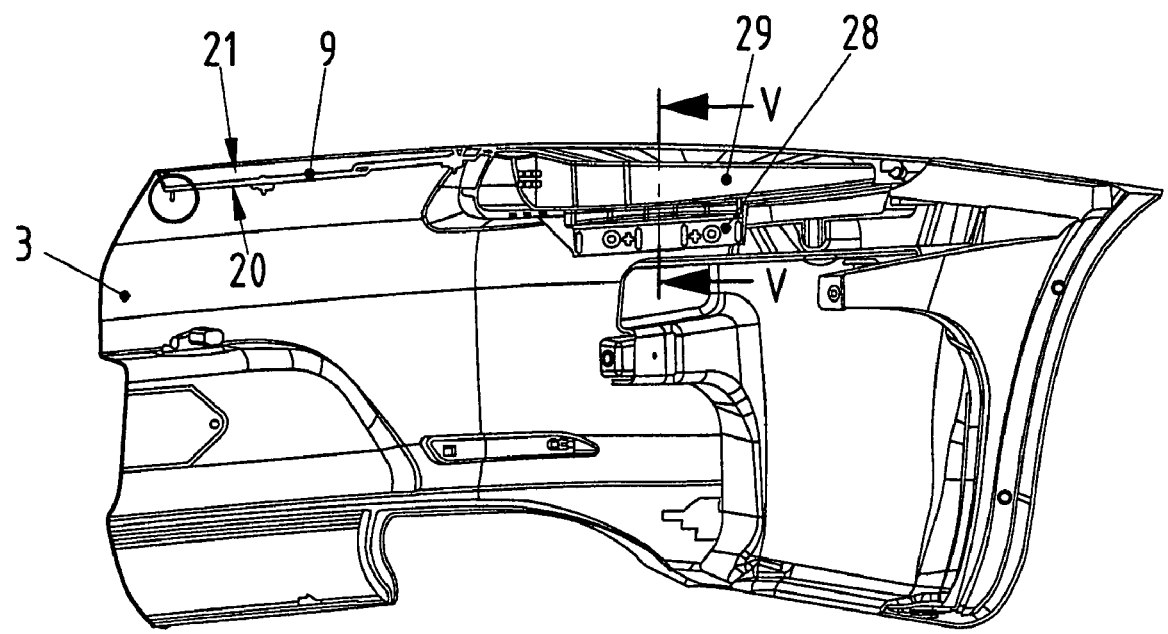
FIG. 7 is a diagrammatic illustration of the connection of the rear-end trim panel to the assembly carrier and to a retaining strip which is arranged on the base of a rear-end lamp.

Referring now to the figures of the drawing in detail and first, particularly, to FIG. 6 thereof, there is shown a vehicle body for a motor vehicle which has, in a rear end, a holding space for a rear-mounted engine, which holding space is surrounded by inner body-side side parts 1, 2 and a rear-end trim panel 3. The rear-end-side holding space for an engine is closed off in an upward direction by a pivotable rear lid 4 and an adjoining spoiler 5 (FIG. 4). The spoiler 5 can be retracted and deployed and, for this purpose, contains a setting-out mechanism M which is driven by a drive motor 6. Furthermore, a closing part 8 behind the spoiler 5 is also activated at the same time, with a bellows 8a as a further closing part being provided at the front side.

An assembly carrier 9 which is arranged in a vehicle transverse direction is inserted between the two body-side inner side parts 1, 2. The assembly carrier 9 holds pre-assembled components, such as for example the setting-out mechanism M for the spoiler 5, the drive motor 6 with driveshafts 6a, 6b, a cover lock 11 with a Bowden cable 11a and the spoiler 5 via the setting-out mechanism M. The spoiler 5 may either be pre-assembled only with a lower part 5a, or else the lower part 5a and upper part 5b may be pre-assembled together on the assembly carrier 9 by the setting-out mechanism M.

The assembly carrier 9 is fixedly connected with its free ends 12, 13 by in each case at least two fastening devices 14, 15 and 16, 17 to the inner side parts 1, 2. p A centering pin or locating pin 18, 19 for positional fixing on the side parts 1, 2 is arranged between the fastening devices 14 to 17 on each side.

To fix and position the components 5, 6, M, 11 and 27 which are to be pre-assembled, the assembly carrier 9 has corresponding contact surfaces A, A1, A2 and A3 on the upper side O and on the underside U and on its end side.

The assembly carrier 9 has, on its transversely-running rear edge—as viewed in relation to the direction of travel F—a horizontally aligned contact surface 20 on which an edge 21 of the rear-end trim panel 3 rests and is connected to the contact surface 20.

The assembly carrier 9 has, on its underside U on the contact surface A, the drive motor 6 which contains the drive shafts 6a and 6b. The cover lock 11 is arranged on the rear side of the assembly carrier 9 on the contact surface A2. Furthermore, the setting-out mechanism M for the spoiler 5 is provided on the underside U of the contact surface A1 of the assembly carrier 9. Furthermore, the actuating element 21 with the Bowden cables 11a and the cover lock 11 are arranged on the upper side O of the assembly carrier 9 on the contact surface A3.

Openings 23, 23a are arranged in the assembly carrier 9, through which openings 23, 23a partially extend the setting-out mechanism M or actuating levers of the mechanism which are connected to the spoiler lower part 5a.

In the exemplary embodiment, the assembly carrier 9 is composed of a cast aluminum part and has, in cross section, a plurality of steps S, S1 and is provided, in the central region, with two transversely running hollow ribs 26, 26a. Alternatively, the assembly carrier 9 may also be composed of sheet metal or fiber-reinforced plastic. A further connection V of the rear-end part 3 to the vehicle body takes place, as viewed in a continuation of the assembly carrier 9, on a retaining strip 28 which is arranged below a light box 29 for a rear-end lamp.

The invention claimed is:

1. A vehicle body for a motor vehicle, comprising:
    a setting out mechanism;
    a spoiler being retracted and deployed by said setting-out mechanism;
    a pivotable rear lid;
    fastening devices;
    a vehicle rear end having body-side inner side parts disposed so as to be spaced apart from one another, and an outer rear-end trim panel which, with said body-side inner side parts, surrounds a holding space for a rear-mounted engine, said holding space is closed off by said pivotable rear lid which is adjoined by said spoiler; and
    an assembly carrier disposed in a vehicle transverse direction and inserted between said two inner body-side side parts of said vehicle rear end, said assembly carrier holding pre-assemblable components and can be connected to said outer rear-end trim panel, said assembly carrier is fixedly connected to said two inner side parts by said fastening devices, and said assembly carrier forming a stiffening body cross member, said assembly carrier further connected to said outer rear-end trim panel.

2. The vehicle body according to claim 1, wherein said assembly carrier has, on its upper and lower sides and on its end sides, contact surfaces for the pre-assemblable components.

3. The vehicle body according to claim 1,
    wherein said assembly carrier has free ends with bores formed therein, said bores are disposed spaced apart from one another, and provided for said fastening devices for fastening to said body-side inner side parts of the vehicle body; and further comprising in each case one centering pin for providing positional fixing on said body-side inner side parts disposed between said bores.

4. The vehicle body according to claim 1, wherein said assembly carrier has a horizontally aligned end-side contact surface which is directed toward said outer rear-end trim panel and to which a corresponding edge of said outer rear-end trim panel can be connected by fastening means, and said end-side contact surface having fastening bores formed therein.

5. The vehicle body according to claim 1, further comprising a pre-assemblable drive motor with drive shafts, said assembly carrier has, on an underside contact surface and in a vehicle longitudinal central plane, said pre-assemblable drive motor with said drive shafts, which extend to both sides, for said setting-out mechanism of said spoiler.

6. The vehicle body according to claim 3, further comprising a pre-assemblable lock for said pivotable rear lid, said pre-assemblable lock disposed on a rear side on a contact surface of said assembly carrier—as viewed in relation to a direction of travel.

7. The vehicle body according to claim 6, further comprising an actuating element with a Bowden cable for said pre-assemblable lock of said pivotable rear lid, said actuating element with said Bowden cable is disposed on a upper-side contact surface of said assembly carrier, close to one of said free ends of said assembly carrier.

8. The vehicle body according to claim 1, wherein said setting-out mechanism is one of a plurality of setting-out mechanisms for said spoiler and are disposed on said assembly carrier at both sides of a vehicle longitudinal central plane; and further comprising an activation module for a front closing part—in relation to the direction of travel—is disposed on one side.

9. The vehicle body according to claim 1, wherein:

said spoiler has a lower part and an upper shell, said lower part is fastened to said upper shell;

said assembly carrier has a plurality of openings formed therein; and said setting-out mechanism is one of a plurality setting-out mechanisms that project partially through said openings in said assembly carrier and are connected to said lower part of said spoiler.

10. The vehicle body according to claim 1, wherein said assembly carrier is composed of a cast aluminum part and is formed, in cross section, with a plurality of steps and has, in a central region, a plurality of transversely running hollow ribs which are disposed on an upper step of said steps so as to delimit said upper step laterally.

11. The vehicle body according to claim 1, further comprising a retaining strip; and wherein said outer rear-end trim panel is connected to said assembly carrier over one longitudinal region and is connected, over an adjoining further longitudinal region, by means of said retaining strip to a lamp body for a rear-end lamp of an automobile, said lamp body is held on said body-side inner side parts to which said assembly carrier can be fastened.

\* \* \* \* \*